United States Patent Office 3,102,088
Patented Aug. 27, 1963

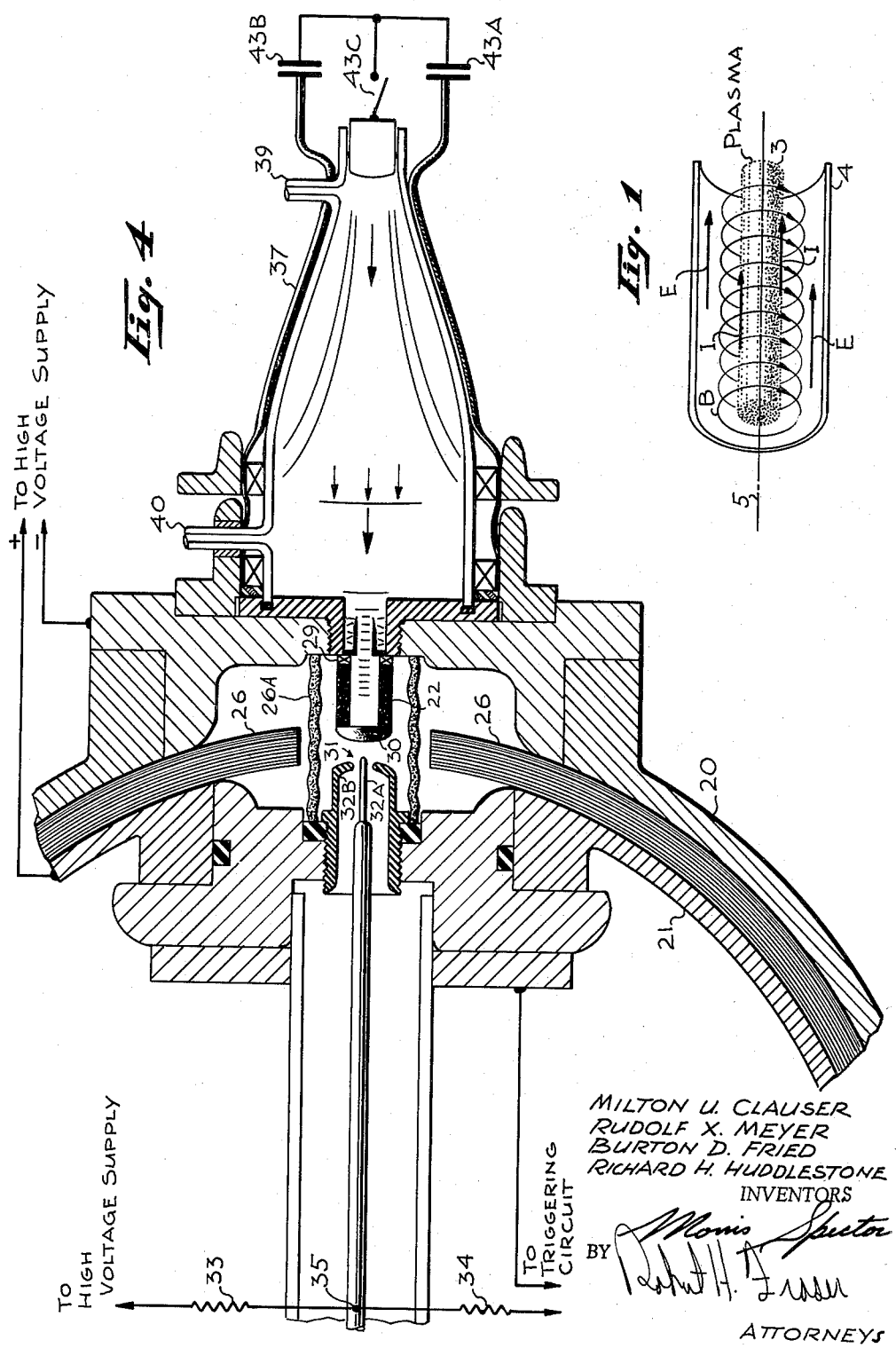

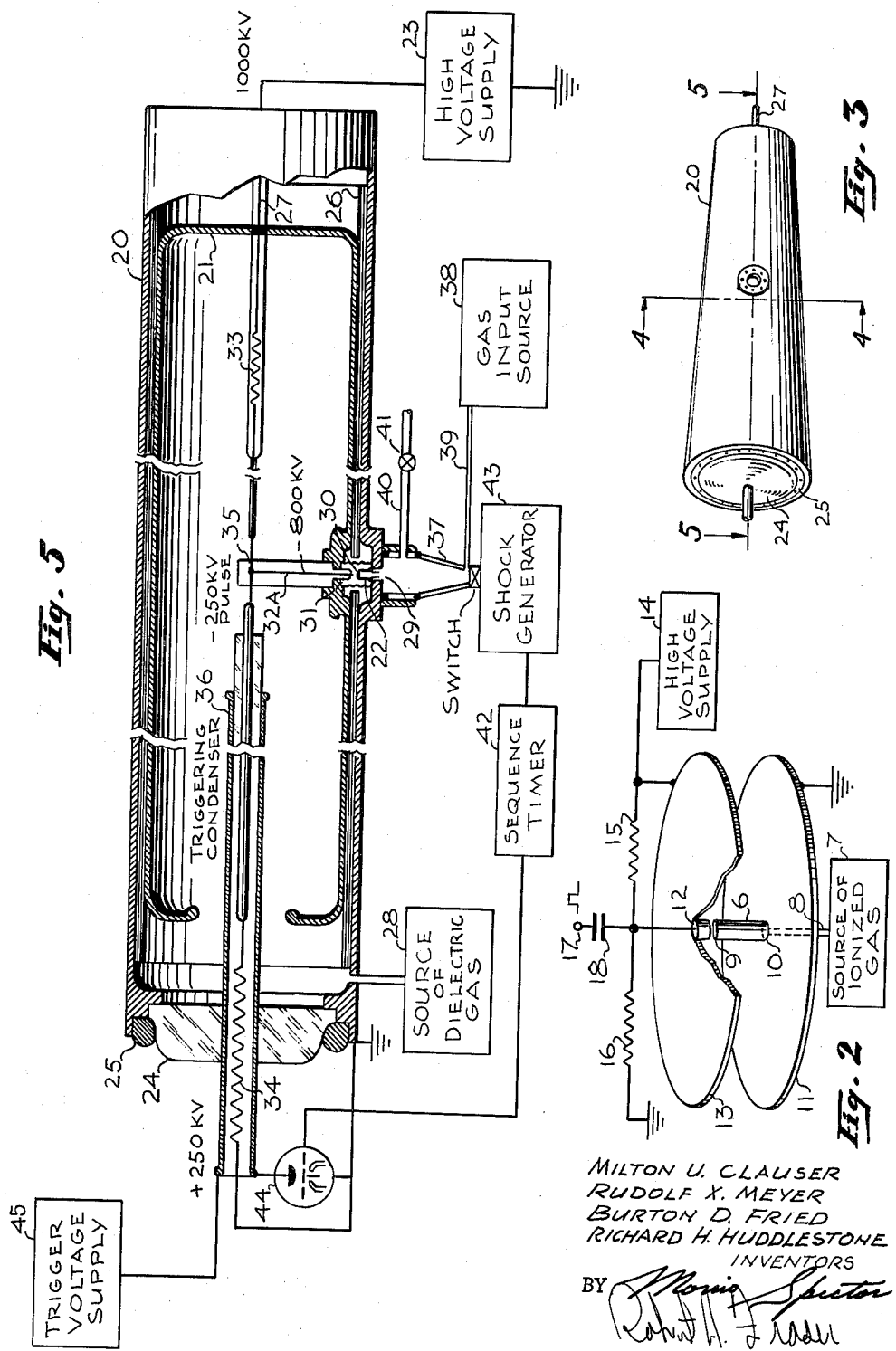

3,102,088
APPARATUS FOR HEATING GASEOUS MATERIALS
Milton U. Clauser, Rolling Hills, Rudolf X. Meyer, Pacific Palisades, and Richard H. Huddlestone and Burton D. Fried, Los Angeles, Calif., assignors, by mesne assignments, to Space Technology Laboratories, Inc., El Segundo, Calif., a corporation of Delaware
Filed Dec. 12, 1958, Ser. No. 780,156
11 Claims. (Cl. 204—193.2)

This invention relates in general to the magnetohydrodynamics art and more particularly to a new and improved system for the nonadiabatic heating of gaseous materials by means of the pinch effect.

In the investigation of thermodynamic processes, as well as in the generation of high energy particles for research and other purposes, it is necessary to accelerate the particles of a gaseous material to a kinetic energy level corresponding to a very high temperature. Since the temperatures at which neutrons are generated are extremely high, being of the order of $10^8$° Kelvin, conventional heating arrangements cannot be employed. However, by accelerating the particles of the gaseous material to a high kinetic energy corresponding to a given temperature, magnetohydrodynamic investigations may be conducted even though a thermal equilibrium is not established. Accordingly, throughout the following description the terms "temperature" and "heat" shall be taken to mean the corresponding levels or increases in kinetic energy of the particles of the gaseous material whether or not thermal equilibrium is established or sustained.

In one known arrangement for accelerating particles of a gaseous material to a high kinetic energy level, an electrically conductive gas, which may be referred to as a plasma, is confined within a tube and a shock wave is generated at one end of the tube which travels along the tube accelerating the gas particles at the interface between the traveling shock wave and the plasma. Thus, the shock wave functions in a manner similar to a piston with each particle acquiring a velocity comparable to the piston velocity. However, as the shock wave travels down the tube, a fairly rapid attenuation takes place so that the shock wave gradually slows down, with the result that kinetic energies of the gas particles corresponding to extremely high temperatures are not achieved.

An additional disadvantage of known arrangements of shock tubes for producing high kinetic energy gas particles is that heated gaseous material is in contact with the side walls of the tube which may, therefore, be expected to deteriorate. More specifically, at the temperatures under consideration, some of the surface material of the walls will become evaporated, thereby contaminating the gaseous particles being accelerated. A detailed description of the production of high kinetic energy gas particles through the use of shock waves may be found in a series of articles under the heading "Magnetically Driven Shock Waves," commencing at page 75 of a symposium entitled "Magnetohydrodynamics," published by the Stanford University Press in 1957, as well as in an article in the Physical Review, vol. 107, No. 2, July 15, 1957, pp. 345–350.

An alternative arrangement for imparting high kinetic energies to the particles of an electrically conductive gas is that in which a discharge tube is arranged to receive a quantity of ionized gas, a high density current then being passed through the gas within the discharge tube. The current passing through the electrically conductive gas establishes magnetic fields which function to constrict or drive the gas particles towards the center of the discharge tube along a central axis parallel to the direction of current flow. The phenomenon by which the magnetic fields function to drive the gas inwardly is referred to as the "pinch effect" and has long been observed in the tendency of fluid metal conductors to pinch off when carrying high currents. A detailed description of the phenomenon may be found in an article by Rosenbluth "Dynamics of a Pinched Gas," appearing at page 57 of a symposium entitled "Magnetohydrodynamics," published by the Stanford University Press in 1957.

In known arrangements for achieving the pinch effect through the passage of high density currents in a discharge tube containing electrically conductive gas, a high density current pulse is generally derived by quickly discharging one or more highly charged capacitors through the gas. However, the density of current discharge is limited by the inductance of the lead wires between the capacitor and the discharge tube, as well as by the delay encountered as a result of the transit time for energy traveling from the far reaches of the capacitor to the discharge tube so that in known arrangements gas particles have not been accelerated to kinetic energy levels at which proper investigations of thermonuclear reactions may be made. In addition, the presence of electrical conductors and/or capacitor plates charged to high voltage levels makes the operation of known arrangements hazardous and leads to undesirable corona discharge effects.

Accordingly, it is a principal object of the present invention to provide new and improved apparatus for imparting kinetic energy to gas particles.

It is an additional object of the present invention to provide new and improved apparatus for accelerating gas particles to high kinetic energy levels by means of the pinch effect.

It is yet another object of the present invention to provide apparatus for substantially reducing the delay in passing a high density current pulse through an electrically conductive gas.

It is still another object of the present invention to provide a non-adiabatic gas heating system for accelerating gas particles to kinetic energy levels higher than heretofore achievable.

It is a still further object of the present invention to provide a new and improved capacitor discharge system for shortening the discharge time involved in discharging a capacitor through a discharge tube to obtain a high density current therein.

The present invention overcomes the above and other disadvantages and limitations encountered in prior art apparatus by disposing a discharge tube between the plates of a capacitor in such a manner that energy may be passed isotropically and omnidirectionally from the capacitor through the discharge tube. According to a basic concept of the present invention, a discharge tube is disposed relative to a capacitor such that the energy contained in the field of the capacitor is directed through the discharge tube along the most abbreviated path possible between the capacitor and tube. In accordance with the stated concept, a discharge tube may be mounted between the plates of a capacitor and symmetrically with respect thereto.

More particularly, according to an embodiment of the invention, an inner cylindrical capacitor plate is coaxially arranged within an outer cylindrical capacitor plate with the discharge tube being disposed between the capacitor plates in a region substantially equidistant from the ends of the plates so that stored energy in the peripheral regions of the capacitor arrives at the discharge tube at substantially the same time. A switching device is connected between the discharge tube and one of the cylindrical capacitor plates so that the capacitor may be selectively discharged through the discharge tube. A shock tube is arranged to ionize the gas utilized and drive it into the discharge tube with a sequence timing arrangement being included to trigger automatically the switching device to initiate the discharge of the capacitor through the discharge tube at the optimum time. By disposing the discharge tube symmetrically with respect to the peripheral boundaries of the capacitor plates, adverse inductance and transit time difficulties are minimized, a high energy discharge or, stated differently, a high density current discharge thereby being achieved within the desired short interval of time. Furthermore, by the use of coaxial capacitor plates, the outer capacitor plate may be held at ground potential and the isolated inner capacitor plate charged so as to achieve safety in operation and absence of corona discharge.

A better understanding of the invention may be had from a reading of the following detailed description and an inspection of the drawings, in which:

FIG. 1 is a diagrammatic illustration of the currents and magnetic fields which produce the pinch effect;

FIG. 2 is a diagrammatic illustration of one form of apparatus in accordance with the invention;

FIG. 3 is a perspective view of a portion of a preferred capacitor discharge system in accordance with the invention;

FIG. 4 is a fragmentary view taken along line 4—4 of FIG. 3 including a shock tube arrangement not shown in FIG. 3; and FIG. 5 is a sectional view taken along line 5—5 of FIG. 3 including in block diagram form various components of a complete operable system utilizing the apparatus of FIGS. 3 and 4.

In FIG. 1 there is illustrated diagrammatically the relationship between the potential gradient E, the current I, and the resultant magnetic field B produced when a current is passed through an electrically conductive gas 3, i.e. plasma, within a cylindrically-shaped discharge tube 4 (broken away for the sake of illustration in FIG. 1). Thus, with the current I flowing in a longitudinal direction through ionized gas 3, the potential gradient E is also longitudinally directed, as shown. Assuming that the ionized gas, i.e. plasma, constitutes a near perfect electrical conductor, substantially all of the current I flows along the surface of the plasma 3 and, furthermore, this produces a magnetic field represented by the circular flux lines B which surround the plasma 3 in the manner illustrated.

In accordance with the well known pinch effect phenomenon, the magnetic field B functions to constrict plasma 3 in such a manner that the gas particles are forced inwardly toward the axis 5 of discharge tube 4, the constricting force being proportional to the square of the magnitude of the current I. Consequently, the greater the magnitude of the current built up through the plasma, the greater the acceleration of the gas particles and the greater the final velocity or kinetic energy attained by them. It is thus seen that it is advantageous to reduce the inductive and transit time delays in the buildup of current through the plasma in the shock tube. The apparatus of the present invention produces these advantageous results.

Moreover, in accordance with the principles illustrated in FIG. 1, the gas particles are accelerated toward the central axis 5 of the discharge tube 4 and are, therefore, removed from contact with the inner surface of the discharge tube 4. The pinch effect which may be established in accordance with the principles of FIG. 1 may be observed where the walls of the discharge tube 4 are transparent since at high kinetic energies the gas particles emit radiant energy in the form of light.

While the general principles outlined above in connection with FIG. 1 have been previously employed for experimental purposes in investigating the properties of gaseous materials at high temperatures, there has been no known arrangement by which a superfast pinch is achieved which imparts kinetic energy levels to the gas particles corresponding to temperatures in the thermonuclear range. In accordance with the apparatus of the present invention described below, a superfast pinch may be readily achieved for imparting the desired kinetic energy to the particles of an electrically conductive gas.

An arrangement for achieving a superfast pinch in accordance with the principles of the invention is illustrated in FIG. 2 in which a discharge tube 6 is arranged to receive an electrically conductive gas from a source of ionized gas 7 via the conduit 8. Discharge tube 6 has a pair of electrodes 9 and 10 by means of which high density current pulses may be passed through a plasma within the discharge tube. One of the electrodes, namely, electrode 10, may be directly connected to the center of a circular capacitor plate 11. A triggered switch 12 is connected to the center of a circular capacitor plate 13 in a position adjacent the other electrode 9. A suitable dielectric material (not shown) may be placed between circular capacitor plates 11 and 13 and a high voltage supply 14 is connected across the capacitor plates to charge them to a sufficiently high level to produce a high density current flow through the discharge tube 6, thereby to produce a superfast pinch in the plasma contained therein.

A triggering electrode of switch 12 is held at a potential lower than that of plate 13 by means of a voltage divider comprising a pair of resistors 15 and 16 connected in series between high voltage supply 14 and ground. More specifically, the triggering electrode of switch 12 is held at a potential which is sufficiently low to prevent a discharge between capacitor plates 11 and 13 whereby they are fully charged. However, upon application of a voltage pulse to the triggering electrode of switch 12 via a terminal 17 and a capacitor 18, the potential gradient between capacitor plate 13 and electrode 9 is increased to the dielectric breakdown level, as a result of which capacitor plates 11 and 13 discharge through discharge tube 6. Due to the fact that discharge tube 6 is positioned symmetrically with respect to the boundaries of capacitor plates 11 and 13, the energy in the field of the capacitor arrives at the discharge tube within a minimum transit time and minimally delayed by inductance so that a high density current pulse is rapidly built up and passed through discharge tube 6.

In this connection it can be illustrated that if a gas of density $\rho$ contained in a cylinder of radius "$a$" is to be accelerated to a velocity "$v$" by a non-adiabatic pinch, then the time available for energy transfer is in the order of magnitude of $$\frac{a}{v}$$

Therefore, to obtain optimum results, all of the energy to be transferred to the gas must be stored by the capacitor within a distance from discharge or pinch tube 6 equal to $$\frac{c'a}{v}$$

where $c' = c\epsilon^{-1/2}$ which is the velocity of light in the dielectric (if any) surrounding the pinch tube. The result is that the entire capacitor storage facility for use in rapidly establishing the desired high density current through the discharge tube must be contained within a predetermined distance from the discharge tube, determined in the mathematical manner presented above. This consideration leads to the result that an isotropic and omnidirectional flow of energy towards the discharge tube is ideal and that such results may be achieved by mounting the discharge tube in a centrally located position with respect to the capacitor configuration.

FIG. 2 illustrates one arrangement in accordance with the invention in which discharge tube 6 is positioned in a centrally located position with respect to circular capacitor plates 11 and 13 and, as shown therein, the tube is mounted along the axis of symmetry of the two plates. Hence, the energy arriving at the discharge tube is propagated toward the tube from all directions along the capacitor plates. The result is that a large energy storage facility may be included within the maximum permissible distance from the discharge tube 6. In addition, since no other electrical connections are required between the capacitor plates 11 and 13 and electrodes 9 and 10 of discharge tube 6, the inductance of the arrangement is held to a minimum so that a short rise time of a current pulse through the discharge tube results.

As noted previously, the pinch effect occurring within the discharge tube 6 is observable and may be recorded optically by means of a suitable camera. It should also be noted that since the gas particles are driven inwardly away from the walls of the discharge tube 6, a hot dense plasma may be achieved without deterioration of the discharge tube walls. Suitable magnetic field generating coils may be wound around the discharge tube for sustaining the hot dense plasma away from the walls of the discharge tube, or the arrangement may be employed for confining a plasma through the use of microwave energy shown and described in the copending application of Erich S. Weibel, entitled "Gas Confining Method and Apparatus," filed January 15, 1958, Serial Number 709,-122. However, since the present invention is directed to a new and improved apparatus for achieving a superfast pinch without reference to mechanisms for sustaining the hot gas plasma over an extended period of time, further description of means for sustaining the confined gases is not deemed necessary.

A preferred embodiment for imparting high kinetic energies to the particles of a gas by means of the pinch effect is illustrated in FIGS. 3–5 in which a pair of coaxially disposed cylindrical capacitor plates 20 and 21 are adapted to be discharged through a cylindrically-shaped discharge tube 22 mounted therebetween. The outer cylindrical capacitor plate 20 may be connected to ground with the inner cylindrical capacitor plate 21 being charged to a high potential, such as a million volts, from a high voltage supply 23 (FIG. 5). The high voltage supply 23 may comprise any conventional apparatus for establishing potential levels of the order of $10^6$ volts, such as a voltage multiplying circuit. The outer and inner cylindrical plates 20 and 21, respectively, are constructed of a suitable electrically conductive material such as steel with the ends of the outer cylindrical plate 20 being sealed as, for example, by a dielectric end piece 24 and a ring 25.

Between the cylindrical plates 20 and 21 there may be wound a layer 26 of dielectric insulating material such as the material commonly identified as Mylar. Layer 26 should preferably extend beyond the ends of the inner cylindrical plate 21 so as to minimize discharge of the capacitor through creepage of electrical currents along the surface of the dielectric 26. In a similar means in the region of the discharge tube 22 (FIG. 4), the dielectric layer 26 may be extended to minimize current creepage. Furthermore, to further minimize the possibility of current creepage and undue voltage breakdown, the space around discharge tube 22 wherein very high potential gradients are established is surrounded by a cylindrically and serrated or wavy-shaped electric insulator 26A which is preferably made of a ceramic material. In connection with the manner that insulator 26A helps prevent voltage breakdown, it should be mentioned that due to the high temperatures involved, electrode 30 evaporates somewhat and the resulting metal particles would ordinarily become deposited on the surfaces common to capacitor plates 20 and 21 in the area of the discharge tube. This would ultimately lead to a voltage breakdown and the insulator prevents this from occurring. Actually, the serrations or waves of insulator 26A are very much larger than shown in FIG. 4 so that while metal particles will be deposited on the insulator, "shadow" areas will exist thereon where the particles cannot penetrate so that the integrity of the space relative to voltage breakdown is maintained.

The inner cylindrical plate 21 may be closed at one end to receive an electrical connection post 27 to which high voltage supply 23 is connected. The post 27 may extend through the end of the outer cylindrical plate 20, but must be insulated therefrom. In order to enhance the maximum potential gradient level to which the capacitor plates 20 and 21 may be charged without breakdown, a source of dielectric gas 28 such as the chemical compound $SF_6$ may be connected to fill the chamber between outer and inner cylindrical plates 20 and 21, respectively. The possibility of breakdown between the capacitor plates is minimized still further due to the fact that the surfaces of the plates that face each other are smooth. Accordingly, by means of high voltage supply 23, inner cylindrical capacitor plate 21 may be brought to a high potential level with respect to outer cylindrical capacitor plate 20.

The discharge tube 22 is positioned between the outer and inner cylindrical capacitor plates 20 and 21, respectively, in a region substantially equidistant from the ends of the cylinders. Thus, the storage capacity of the plates 20 and 21 is symmetrically disposed with respect to the location of the discharge tube 22 which is preferably constructed of a transparent material such as quartz or sapphire to enable a visual or optical inspection of the phenomena occurring within. As may be best seen in FIG. 4, at the outer end of the discharge tube 22, a metallic ring electrode 29 may be directly connected to the outer cylindrical capacitor plate 20. At the inner end of the discharge tube 22, an electrode 30 is spaced apart from a novel triggered switch assembly generally designated 31, a new type of triggered switch being needed because of the particularly high voltage levels and relatively small spacings involved herein.

More specifically, conventional trigger gaps are reliably triggered by applying a trigger pulse whose amplitude is greater than the static breakdown of the gap, the pulse being applied directly from a hydrogen thyratron or from a step-up pulse transformer. However, due to the very high static breakdown voltage that is being used herein, hydrogen thyratrons are impractical and pulse transformers unsuitably large and complex. The triggered gap used in triggered switch assembly 31 furnishes reliable triggering and meets satisfactory timing requirements while requiring trigger amplitudes that are less than the static breakdown voltage. The triggered switch is directly connected to the inner cylindrical capacitor plate 21 and is adapted to provide an electrical connection between the inner plate 21 and the electrode 30 when actuated.

Triggered switch assembly 31 comprises a trigger electrode 32A coaxially disposed within a cylindrical metallic ring 32B connected to the plate 21. A voltage divider comprising a pair of resistors 33 and 34 is connected between high voltage supply 23 and ground with the trigger electrode 32A being connected to the junction point 35 between resistors 33 and 34. By a suitable proportioning of the resistors 33 and 34, the trigger electrode 32A may be sustained at a desired potential less than the potential of the inner plate 21. By way of example, if the potential of inner plate 21 is $10^6$ volts, it has been found that a suitable potential for the trigger electrode 32A is one that is equal to four-fifths the potential of the inner plate 21 or $8 \times 10^5$ volts. Thus, there is established in the region of the inner discharge tube electrode 30, a potential gradient that is insufficient to breakdown the dielectric between triggered switch 31 and electrode 30.

By means of a tubular triggering condenser 36 (FIG. 5), a positive going impulse may be applied to the triggering electrode 32A to raise the potential gradient in the region of electrode 30 to a level at which an arc discharge is instituted between electrodes 30 and 32A to connect electrically the charged inner capacitor plate 21 to the electrode 30 and thereby produce the current flow through tube 22. The manner in which the positive going pulse is applied to the trigger condenser 36 to institute the discharge between capacitor plates 20 and 21 is described in detail below.

In the operation of the arrangement of FIG. 5, a desired gas such as deuterium or tritium is introduced into a shock tube 37 from a gas input source 38 via a conduit 39. A gas outlet conduit 40 may be opened to the atmosphere by means of a bleeder valve 41 to flush the shock tube 37 free of impurities. When the bleeder valve 41 is closed, gas input source 38 preferably establishes a condition in which the gas within the shock tube 37 is held at a predetermined pressure, as for example, between 10 and 200 microns of mercury.

After the capacitor plates 20 and 21 have been charged to a predetermined level by the high voltage supply 23 and the shock tube 37 is filled with gas from gas input source 38, a sequence timer 42 may be arranged to actuate a shock generator 43 connected between the sequence timer and shock tube 37. Shock tube generator 43 may be of any conventional form which is capable of establishing a shock wave within shock tube 37 which travels toward discharge tube 22. A detailed description of a suitable shock generator may be found in an article entitled "Production of High Velocity Shocks," by Vernal Josephson, appearing in the Journal of Applied Physics, vol. 29, No. 1, pp. 30–32, January 1958. A diagrammatic illustration of one such arrangement is shown in FIG. 4 in which the capacitors 43A and 43B are arranged to be discharged by a switch 43C to institute a shock wave within the shock tube 37. The switch 43C may be a triggered switch similar to the triggered switch 31 described in detail above which receives a pulse from the sequence timer 42.

As noted previously, the action of a shock wave traveling along a gas-filled tube functions to ionize and propel the gas particles at the interface between the wave and the gas. Thus, the gas particles may be accelerated to kinetic energy levels corresponding to temperatures of the order of $10^5$° Kelvin within the shock tube 37. The outer end of discharge tube 22 adjacent the ring electrode 29 is apertured and formed to receive a central core of the gas propelled along the shock tube 37 by the shock wave. For simplicity of designation, the open end of discharge tube 22 is sometimes referred to as a "cookie cutter." The advantage in selecting the central core of the propelled gas is that the central core is substantially freer of impurities than the portions of the gas propelled along the sidewalls of the shock tube 37.

As soon as the electrically conductive gas is driven fully into the discharge tube 22 by the shock wave, the sequence timer 42 applies a pulse to a switching tube 44 which is connected between the tubular outer plate of the triggering condenser 36 and ground. The sequence timer 42 may comprise a delay line of a suitable length which applies a pulse to the tube 44 which is delayed by a predetermined extent with respect to the pulse applied to the shock generator 43 corresponding to the time required for the shock wave to travel the length of the shock tube 37. In response to said pulse, the tube 44 fires and thereby shorts the outer plate of condenser 36 to ground.

Since, as is shown, this outer plate of triggering condenser 36 is normally held at a charged potential level by a trigger voltage supply 45, which may be of the order of 250 kilovolts, the sudden connection of the tubular plate of the triggering condenser to ground causes a pulse to be applied to the junction point 35 whose magnitude is the voltage to which the tubular outer plate is charged, namely 250 kilovolts. The same pulse is therefore applied to the triggering electrode 32A and, as a result of the increased voltage existing between electrode 32A and electrode 30, the dielectric between the inner discharge tube electrode 30 and the triggering electrode 32A breaks down and this breakdown shifts immediately to the main gap region so as to initiate the discharge of the capacitor plates 20 and 21 through the plasma within the discharge tube 22. More specifically, the current flows from capacitor plate 21 through triggering switch assembly 31 to electrode 30 and from this electrode the current flows through the plasma in discharge tube 22 to electrode 29 whereat the current enters capacitor plate 20. A current discharge does not occur at any points between capacitor plates 20 and 21 other than through discharge tube 22. Since the discharge tube 22 is directly connected between the plates 20 and 21 during the discharge interval, and is disposed in a region at which the energy stored within the capacitors 20 and 21 arrives from the periphery of the plates 20 and 21 at substantially the same time, a high density current pulse is passed to the ionized plasma, which may be of the order of $10^6$ amperes, to create a fast pinch effect in which the gas particles are accelerated to kinetic energy levels corresponding to temperatures of the order of $10^8$° Kelvin.

Through the configuration of the arrangement of FIGS. 3–6 in which the capacitor is symmetrically disposed with respect to the discharge tube 22, a maximum energy transfer may be achieved during a short interval such as .01 microsecond. In addition, since the discharge tube 22 is directly connected between the plates 20 and 21 during the discharge interval, lead lines or bus bars are avoided so that the effects of inductance are minimized with the result that a fast rise time of the current pulse may be achieved. Furthermore, even though the capacitor plate 21 is maintained at extraordinarily high voltages, such as $10^6$ volts, it is surrounded by the grounded capacitor plate 20 so that there is little hazard in the operation of the mechanism and corona discharge effects are reduced to a minimum.

A suitable camera (not shown) of either optical or electronic character may be positioned adjacent the walls of the discharge tube 22 for recording the phenomena of the pinch effect occurring within the discharge tube. As noted previously in connection with the discussion of the apparatus of FIG. 2, stabilizing magnetic fields or suitable microwave confining techniques may be employed to sustain the pinched gas, if desired.

In one workable embodiment of the invention constructed for the purpose of investigating gas thermodynamic phenomena, the inner cylindrical capacitor plate 21 had a length, $L_1 = 117$ cm. and a radius, $R_1 = 18.7$ cm. The dielectric layer 26 was of a thickness, $h = 1.27$ cm. and a dielectric constant $\epsilon = 3$. The discharge tube 22 had a length of 2.54 cm., and an inner radius of 0.635 cm. The capacity of the plates 20 and 21 equalled $$C = \frac{R_1 L_1 \epsilon}{2h} = 2870 \text{ mmfd.}$$

The inductance of the apparatus as a whole was determined by filling the discharge tube 20 with mercury and measuring the ringing frequency, giving a period of $5.5 \times 10^{-8}$ sec. corresponding to an inductance value of .0267 microhenry.

With the above parameters, the capacitor is capable of withstanding a voltage of the order of $10^6$ volts which is sufficiently large to accelerate the gas particles of a plasma to kinetic energies well within the desired range.

Although there have been described above and illustrated in the drawings particular arrangements of the invention for expediting the attainment of a high current density discharge of a capacitor through a discharge tube for the purpose of imparting kinetic energy to gas particles in accordance with the pinch effect, it will be appreciated that the invention is not limited to the specific illustrative arrangements. Accordingly, any modifica-

What is claimed is:

1. Gas heating apparatus comprising: a pair of electrically charged cylindrical capacitor plates coaxially arranged one inside the other, said plates having aligned orifices therethrough located substantially equidistantly from their ends; a current discharge tube including an open-ended cylindrically-shaped body member enclosed by a first electrode at one end and having an annular second electrode mounted on the other end, said discharge tube being disposed between said capacitor plates and mounted to said outer plate in such a manner that the open annular electrode end of said tube is in alignment with the orifice of said outer plate; means for injecting an ionized gas of known characteristics through said outer plate orifice and into said discharge tube; and triggered switch means coupled to said means and to said capacitor plates, said switch means being operable to discharge said capacitor plates through said discharge tube, whereby a pinch effect is produced by which high kinetic energies are imparted to the ionized gas particles.

2. The apparatus defined in claim 1 wherein said means for injecting ionized gas into said discharge tube includes a shock tube containing the gas coupled to said discharge tube through the associated orifice, means for establishing a shock wave within said shock tube which ionizes the gas contained therein and drives said gas into said discharge tube, and means coupled between said last-named means and said triggered switch means and operable in response to said shock wave to trigger said switch means to discharge said capacitor plates.

3. The apparatus defined in claim 1 wherein said triggered switch means includes a timer device coupled to said means and operable in response to the injection of gas by said means to produce a triggering voltage pulse when said gas has been driven into said discharge tube; voltage divider apparatus connected between said capacitor plates for dividing the voltage between said capacitor plates resulting from the charge thereon in a predetermined ratio; a switch assembly including a cylindrically-shaped electrode mounted on said inner capacitor plate for electrical connection thereto and in alignment with the orifice through said inner plate, and a probe electrode connected at one end to said voltage divider apparatus in such a manner as to be at a different potential than said inner plate and extending at the other end through said cylindrically-shaped electrode toward the first electrode of said discharge tube; and means for producing voltage pulses coupled between said voltage divider apparatus and said timer device, said means being operable in response to said triggering voltage pulse to apply another voltage pulse to said voltage divider apparatus to increase the potential on said probe electrode to substantially the potential of said inner capacitor plate, whereby said capacitor plates rapidly discharge through said switch assembly and discharge tube to produce said pinch effect.

4. Gas heating apparatus comprising: a pair of electrically charged cylindrical capacitor plates coaxially arranged one inside the other, said plates having a pair of aligned orifices therethrough located substantially equidistantly from its ends, a current discharge tube including an open-ended cylindrically-shaped body member enclosed by a first electrode at one end and having an annular second electrode mounted on the other end, said discharge tube being disposed between said capacitor plates and mounted to said outer plate in such a manner that the open annular electrode end of said tube is in alignment with the orifice through said outer plate; a shock tube containing a gas of known characteristics coupled to said discharge tube through the orifice of said outer plate; means for establishing a shock wave within said shock tube which ionizes the gas contained therein and drives the gas into said discharge tube; a timer device coupled to said means and operable in response to the injection of gas by said means to produce a triggering voltage pulse when said gas has been driven into said discharge tube; voltage divider apparatus connected between said capacitor plates for dividing the voltage between said capacitor plates resulting from the charge thereon in a predetermined ratio; a switch assembly including a cylindrically-shaped electrode mounted on said inner capacitor plate for electrical connection thereto and in alignment with the orifice through said inner plate, and a probe electrode connected at one end to said voltage divider apparatus in such a manner as to be at a different potential than said inner plate and extending at the other end through said cylindrically-shaped electrode toward the first electrode of said discharge tube; and means for producing voltage pulses coupled between said voltage divider apparatus and said timer device, said means being operable in response to said triggering voltage pulse to apply another voltage pulse to said voltage divider apparatus to increase the potential on said probe electrode to substantially the potential of said inner capacitor plate, whereby said capacitor plates rapidly discharge through said switch assembly and discharge tube to produce a pinch effect by which high kinetic energies are imparted to the ionized gas particles.

5. Apparatus for imparting kinetic energy to ionized gas particles including the combination of a capacitor having at least two coaxially disposed cylindrical plates, a discharge tube disposed between the cylindrical plates in a centrally located position, means introducing ionized gas into the discharge tube, a high voltage source coupled to the capacitor for charging the capacitor to a level at which a pinch effect is produced in the ionized gas when the capacitor is discharged through the discharge tube, and means selectively discharging the charged capacitor through the discharge tube to create a pinch effect in which high kinetic energies are imparted to the ionized gas particles.

6. A non-adiabatic gas heating arrangement including the combination of a discharge tube, a first electrode mounted at one end of the discharge tube, a second electrode mounted at the other end of the discharge tube, a first cylindrical capacitor plate mounted adjacent the first electrode in a position in which the ends of the cylindrical plate are equidistant from the discharge tube, a triggered switch connected between the first cylindrical capacitor plate and the first electrode, a second cylindrical plate coaxially arranged with respect to the first cylindrical capacitor plate and directly connected to the second electrode in a position in which the discharge tube is equidistant from each end of the second cylindrical plate, means introducing electrically conductive gas into the discharge tube, means connected to the first capacitor plate for establishing a potential gradient between the first and second capacitor plates representing an energy storage sufficiently large to create a pinch effect in the gas within the discharge tube when the capacitor is discharged therethrough, and means applying a voltage pulse to the triggered switch for electrically connecting the first cylindrical capacitor plate to the first electrode to discharge the capacitor through the discharge tube whereby a pinch effect is established in which high kinetic energies are imparted to the ionized gas particles.

7. Apparatus in accordance with claim 6 in which the means for introducing ionized gas into the discharge tube includes a shock tube connected to the discharge tube, and means for establishing a shock wave within the shock tube which ionizes the gas contained therein and drives the gas into the discharge tube.

8. A non-adiabatic gas heating arrangement including the combination of a discharge tube, a first electrode mounted at one end of the discharge tube, a second electrode mounted at the other end of the discharge tube, an inner cylindrical capacitor plate mounted adjacent the first electrode in a position in which the ends of the cylindrical plate are equidistant from the discharge tube, a triggered switch connected between the inner cylindrical capacitor plate and the first electrode, an outer cylindrical plate coaxially arranged with respect to the inner cylindrical capacitor plate and directly connected to the second electrode in a position in which the discharge tube is equidistant from each end of the outer cylindrical plate, means introducing electrically conductive gases into the discharge tube, means connected to the inner capacitor plate for establishing a potential gradient between the inner and outer capacitor plates representing an energy storage sufficiently large to create a pinch effect in the gas within the discharge tube when the capacitor is discharged therethrough, and means applying a voltage pulse to the triggered switch for electrically connecting the inner cylindrical capacitor plate to the first electrode to discharge the capacitor through the discharge tube whereby a pinch effect is established in which high kinetic energies are imparted to the ionized gas particles.

9. Apparatus in accordance with claim 8 in which the means for introducing ionized gas into the discharge tube includes a shock tube connected to the discharge tube, and means for establishing a shock wave within the shock tube which ionizes the gas contained therein and drives the gas into the discharge tube.

10. Apparatus for heating a gaseous material including the combination of an open-ended discharge tube, a capacitor symmetrically disposed about the discharge tube for discharge therethrough with a high intensity current containing energy derived isotropically and omnidirectionally from the capacitor, a shock tube connected to the open end of the discharge tube, means introducing a gaseous material into the shock tube, a shock generator connected to the shock tube for generating a shock wave within the shock tube which ionizes the gas contained therein and drives the gas into the discharge tube, a triggered switch connected between the capacitor and the discharge tube, and means triggering a discharge of the capacitor through the discharge tube in a predetermined time relationship with respect to the generation of a shock wave by the shock generator to produce a pinch effect in the gaseous material within the discharge tube.

11. A non-adiabatic gas heating arrangement including the combination of a discharge tube, a first electrode mounted at one end of the discharge tube, a second electrode mounted at the other end of the discharge tube, an inner cylindrical capacitor plate mounted adjacent the first electrode in a position in which the ends of the cylindrical plate are equidistant from the discharge tube, a triggered switch connected between the inner cylindrical capacitor plate and the first electrode, an outer cylindrical plate coaxially arranged with respect to the inner cylindrical capacitor plate and directly connected to the second electrode in a position in which the discharge tube is equidistant from each end of the outer cylindrical plate, a shock tube connected to the discharge tube, means introducing a gaseous material into the shock tube, a shock generator connected to the shock tube for generating a shock wave within the shock tube which ionizes the gas contained therein and drives the gas into the discharge tube, means connected to the inner capacitor plate for establishing a potential gradient between the inner and outer capacitor plates representing an energy storage sufficiently large to create a pinch effect in the gas within the discharge tube when the capacitor is discharged therethrough, and means applying a voltage pulse to the triggered switch for triggering a discharge of the capacitor through the discharge tube in a predetermined time relationship with respect to the generation of a shock wave by the shock generator to produce a pinch effect in the gaseous material within the discharge tube.

References Cited in the file of this patent

UNITED STATES PATENTS

| 2,728,877 | Fischer | Dec. 27, 1955 |
| 2,911,567 | Fischer | Nov. 3, 1959 |

FOREIGN PATENTS

| 1,022,711 | Germany | Jan. 16, 1958 |

OTHER REFERENCES

Project Sherwood, by Amasa S. Bishop: Addison-Wesley Publ. Co., Reading, Mass. (September 1958), pp. 143–147.

Proceedings of the Second United Nations International Conference on the Peaceful Uses of Atomic Energy, vol. 32, held in Geneva Sept. 1–13, 1958; pages 161–168 (Paper by M. U. Clauser and E. S. Weibel), and pages 308, 309.